US006387472B1

(12) United States Patent
Reck et al.

(10) Patent No.: US 6,387,472 B1
(45) Date of Patent: *May 14, 2002

(54) DECORATION FOIL FOR DECORATION OF THREE-DIMENSIONAL SUBSTRATE SURFACES

(75) Inventors: Robert Reck, Nürnberg; Joachim Süss, Fürth; Heinrich Wild, Herzogenaurach, all of (DE)

(73) Assignee: Leonhard Kurz GmbH & Co., Fürth (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,116

(22) Filed: Jul. 15, 1998

Related U.S. Application Data

(63) Continuation of application No. PCT/DE96/00516, filed on Mar. 18, 1996.

(51) Int. Cl.[7] ........................ B32B 3/00
(52) U.S. Cl. ........................ 428/195; 428/343; 428/480
(58) Field of Search ........................ 428/161, 172, 428/195, 200, 201, 204, 207, 212, 335, 336, 337, 343, 349, 354, 411.1, 474.4, 480, 483, 488.4, 522, 913, 914

(56) References Cited

U.S. PATENT DOCUMENTS

| | | | | | |
|---|---|---|---|---|---|
| 3,666,516 | A | | 5/1972 | Dunning | |
| 3,770,479 | A | | 11/1973 | Dunning | |
| 3,953,635 | A | | 4/1976 | Dunning | |
| 4,232,077 | A | * | 11/1980 | Meisel | 428/174 |
| 4,717,615 | A | * | 1/1988 | Reinhart | 428/161 |
| 4,837,072 | A | * | 6/1989 | Kraetschmer | 428/301 |
| 4,943,680 | A | * | 7/1990 | Ellison et al. | 427/154 |
| 4,948,654 | A | | 8/1990 | Brooks et al. | |
| 5,053,260 | A | * | 10/1991 | Brehm | 428/40 |
| 5,114,789 | A | * | 5/1992 | Reafler | 428/328 |
| 5,215,826 | A | * | 6/1993 | Shimanski et al. | 428/483 |
| 5,304,453 | A | | 4/1994 | Lin | |
| 5,342,666 | A | * | 8/1994 | Ellison et al. | 428/46 |
| 5,393,590 | A | * | 2/1995 | Caspari | 428/195 |
| 5,413,840 | A | | 5/1995 | Mizuno | |
| 5,503,905 | A | | 4/1996 | Boris | |
| 5,665,475 | A | * | 9/1997 | Sussner | 428/488.4 |
| 5,997,263 | A | | 12/1999 | Phillips | |

FOREIGN PATENT DOCUMENTS

| | | |
|---|---|---|
| DE | 94 04 567.4 | 5/1994 |
| EP | 0 230 364 A2 | 7/1987 |
| WO | WO 92/05030 | 4/1992 |
| WO | WO 92/11139 | 7/1992 |

* cited by examiner

*Primary Examiner*—Bruce H. Hess
*Assistant Examiner*—Michael E. Grendzynski
(74) *Attorney, Agent, or Firm*—Akin, Gump, Strauss, Hauer & Feld, L.L.P.

(57) ABSTRACT

A decoration foil for the decoration of three-dimensional substrate surfaces with heating comprises a carrier film which is a substantially amorphous, unstretched polyester, polyamide or polyamide-copolymer film on which is arranged a decorative layer which is formed by at least one lacquer layer printed thereon, with the formation of a decoration in accurate register relationship.

9 Claims, 1 Drawing Sheet

DECORATION FOIL FOR DECORATION OF THREE-DIMENSIONAL SUBSTRATE SURFACES

CROSS REFERENCE TO RELATED APPLICATION

This application is a continuation of co-pending International Application No. PCT/DE96/00516, filed Mar. 18, 1996. The entire disclosure of International Application No. PCT/DE96/00516 as filed is incorporated herein by reference.

BACKGROUND 0F THE INVENTION

The invention concerns a decoration foil for decorating three-dimensional substrate surfaces with heating.

A decoration foil for decorating a substrate surface may in one form comprise a carrier film and a decorative layer which is arranged thereon and which is formed by at least one lacquer layer which is printed on, forming a decoration in accurate register relationship.

Such decoration foils can be either in the form of transfer foils in the manner of a hot stamping foil, or a lamination foil. When the foil is in the form of a n transfer foil, the decorative layer is detached from the carrier film during the transfer procedure, while lamination foils are transferred onto the substrate to be decorated, as a whole, that is to say, both the carrier film and also the decorative layer are applied to the substrate surface.

Decoration foils comprising a carrier film and a decorative layer which forms the actual decoration are used in a very wide range of different areas, one of the areas of use being the decoration of three-dimensional surfaces. When a surface of that kind is to be provided with a decorative film, the decoration foil which serves to apply the decorative film must be capable of adapting to the irregularities of the surface with the maximum degree of accuracy, for which purpose it is also necessary for the decoration foil to be able to stretch sufficiently, if required. That property plays a part in particular in regard to the decoration of three-dimensional molded parts in presses, in which the decoration film is applied against the surface of the molded part, either by means of a membrane or only with the generation of suitable pressure differences. A further area of use is so-called “insert molding”, in which the foil is introduced into an injection molding mold and then plastic material is injected behind it, producing the molded part.

Success has already been achieved in producing decoration foils which are particularly suitable for those purposes, but only for those areas of use in which a given patterning effect on the decoration foil or the like is not an important consideration. This means for example when a wood surface is to be imitated by means of the decoration foil, that the “graining” effect which is imitated by the decorative layer of the decoration foil may possibly have considerable irregularities.

BRIEF SUMMARY OF THE INVENTION

An object of the present invention is to provide a decoration foil which is suitable more especially for the decoration of finely structured, three-dimensional substrate surfaces.

Another object of the invention is to provide a decoration foil such that, when the decoration foil is applied to a three-dimensional substrate surface an accurately matching decoration which is present in the decorative layer is not altered or is altered in an accurately predetermined manner.

Still another object of the invention is to afford a decoration foil which makes it possible for finely structured, three-dimensional substrate surfaces to be satisfactorily decorated with a pattern which can be accurately predetermined.

It was now surprisingly found that in accordance with the invention the above-indicated objects can be achieved in an extremely simple fashion by a decoration foil in the manner of a thermal transfer foil for decorating three-dimensional substrate surfaces with heating, comprising a carrier film and a decorative layer which is arranged thereon and which is formed by at least one lacquer layer printed on in region-wise fashion, forming a decoration in accurate register relationship. A substantially amorphous, unstretched polyester, polyamide or polyamide-copolymer film serves as the carrier film. An adhesive layer is provided for fixing to the substrate surface and the decorative layer is arranged between the carrier film and the adhesive layer. The carrier film can preferably be a polyethylene terephthalate film.

For the specifically intended areas of use decoration foils in accordance with the invention with an amorphous, unstretched polyamide or polyester film as the carrier film have in particular the advantage that they can be very considerably deformed, more specifically such deformation already occurring at comparatively low temperatures. Furthermore, as is familiar in itself, polyester films are highly resistant to the usual solvents. A further advantage of the carrier film of the foil in accordance with the invention is the comparatively low cost thereof.

Hitherto, PVC-carrier films have already been successfully used for comparable areas of use. However such films are objectionable in regard to the environmental problems which occur upon disposal thereof. The use of PE- or PP-foils which are usual on the market, as the carrier film, cannot be considered for the purposes of the invention because foils of that kind cannot be adequately deformed and in particular such deformation does not already occur at comparatively low temperature.

It is admittedly basically known that films of amorphous, unstretched polyester or polyamide already experience considerable deformation at low temperature. However it is precisely those properties and the initially severe shrinkage characteristic of such films upon heating that cause them to appear unsuitable when the situation involves applying by printing a decoration in accurate matching or register relationship, using a suitable lacquer. When passing through the printing machine and in particular upon drying of the lacquer layer, it is in fact not possible to avoid corresponding traction being applied to the carrier film, nor is it possible to prevent it from being heated. Consequently there must be a fear that the decoration which is originally applied by printing, on passing through the printing machine, experiences considerable changes and loses its register accuracy.

Now, the merit of the inventor in the present case is to have realised that these problems can be obviated upon skilled guidance of the carrier film during the printing operation and appropriate formation of the decoration, and decoration foils which are excellently well suited for the specified purposes can be produced, even using the film which appears per se to be unsuitable, comprising amorphous, unstretched polyester or polyamide.

It is precisely the initially considerable shrinkage of the carrier film upon heating that must even be considered as an advantage because it has the result that the decoration foil or in particular the carrier film thereof, upon being transferred to a structured surface, already bears almost entirely against a surface of any configuration, at just relatively low temperatures (from about 80° C.) and under very low working pressures; in that respect, as tests have shown, it is even possible for grooves of a width of less than 1 mm to be suitably decorated with the decoration foil. In this connection the almost complete absence of any restoration tendency in respect of unstretched films after deformation thereof also plays a crucial part, thereby ensuring that the decoration foil, in particular when used as a lamination foil, adheres satisfactorily to the decorated surface after deformation and during cooling, without any tendency for example to pull back out of narrow grooves or the like. Particularly when dealing with parts with edges which fall away steeply, the initially substantial shrinkage effect on the part of the carrier films according to the invention results in a much lower degree of folding, in comparison with PVC-carriers which were used hitherto, while in addition it is possible to use substantially lower molding receiving means, which signifies a cost saving.

The above-mentioned resistance of the carrier film to the aqueous systems and solvents which are usually employed in lacquers and surface coatings respectively affords the advantage that it is possible to use a wide range of lacquers, in which respect it is for example also possible for the degree of shine, which is predetermined in itself, of the carrier film (this is generally slightly matte and semitransparent) to be arranged to correspond to the respective requirements involved, by virtue of a suitable intermediate lacquer layer.

To sum up therefore it is to be noted that the use of an unstretched, amorphous polyester, polyamide or polyamide-copolymer film as the carrier film in decoration foils affords a large number of advantages. Nonetheless the use of such films as carrier films for decoration foils which are decorated in accurate register relationship in a printing process was hitherto considered to be impossible, having regard to the low level of mechanical stability involved and the substantial shrinkage effect. The merit of the inventor is to have investigated and established the suitability of unstretched, amorphous films as a carrier film for the decoration foils, in spite of those alleged problems.

For most areas of use it has been found advantageous for the carrier film to be of a thickness of about 20 to 100 $\mu$m.

In addition, to achieve sufficiently mechanically strong decorations it may preferably be provided that the decorative layer includes at least one decorative lacquer layer forming the decoration in accurate register relationship, and a protective lacquer layer which covers the decorative lacquer layer in use after being applied to the substrate surface. The protective lacquer layer for example may afford suitably high mechanical strength or resistance to UV-light.

It may further be desirable if the decorative layer includes at least one decorative lacquer layer which forms the decoration in accurate register relationship, and a colored lacquer layer which in use after being applied to the substrate surface is beneath the decorative lacquer layer and which is applied over the entire surface area. That affords further possible design configurations.

It is particularly advantageous if an adhesive layer is provided for the purposes of fixing to the substrate surface. In that respect, consideration can be given to the nature of and the surface of the substrate to be decorated, by virtue of a suitable choice of the adhesive layer. In certain cases it would however also be possible to omit the adhesive layer, whether the decorative layer itself has adequate adhesive properties or the adhesive layer is applied prior to application of the decoration foil to the substrate.

As noted it is provided in accordance with the invention that, for the purposes of use of the decoration foil as a thermal transfer foil, the decorative layer is arranged between the carrier film and the adhesive layer, in which case there is advantageously provided between the decorative layer and the carrier film a separation or detachment layer which facilitates detachment of the carrier film after application of the decorative layer to the substrate.

A thermal transfer foil according to the invention is desirably of such a configuration that—if present—the detachment layer, the protective lacquer layer, the decorative lacquer layer, the colored lacquer layer and the adhesive layer are arranged in succession on the carrier film.

However the decoration foil in accordance with the invention can be designed not only as a thermal transfer foil but also as a lamination foil. In the latter case the carrier film, in accordance with the invention, is disposed between the decorative layer and the adhesive layer. In accordance with the invention, in the case of a lamination foil, the carrier film carries in succession on its side remote from the lacquer layer, if present, the colored lacquer layer, the decorative lacquer layer and the protective lacquer layer.

Further objects, features, and advantages of the invention will be apparent from the following description of a preferred embodiment.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings, like numerals are used to indicate like elements throughout. In the drawings.

DETAILED DESCRIPTION OF THE INVENTION

Figure 1:
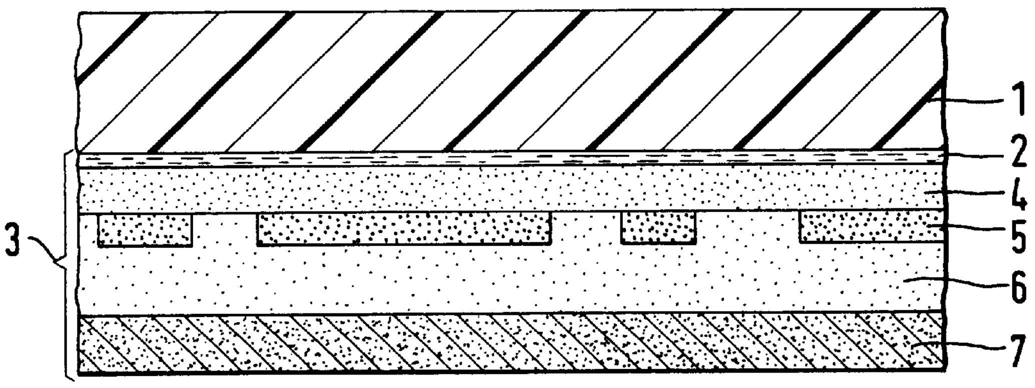
FIG. 1 shows an enlarged, partially broken cross-sectional schematic representation of a thermal transfer foil according to the invention.

It will be noted that the drawing shows diagrammatic partial sections of decoration foils, although the ratios in respect of thickness of the individual layers are not to scale.

Referring firstly to FIG. 1 the thermal transfer foil shown therein includes a carrier film 1 on which a decorative layer which is generally identified by reference numeral 3 is fixed by way of a separation or detachment layer 2, for example a wax layer.

In accordance with the invention the carrier film 1 is a substantially amorphous, unstretched polyester film which may be of a thickness of between 20 and 100 $\mu$m, depending on the area of use involved.

Amorphous, unstretched polyethylene terephthalate films whose softening range is between 70° C. and 80° C. have been found to be particularly suitable. In that respect, stretchability is greater than 300%, when the softening temperature is exceeded. The tensile stress module falls below 500 N when the softening temperature is exceeded.

Besides polyester and in particular polyethylene terephthalate films, amorphous, unstretched polyamide films and films of copolymers based on polyamide with softening temperatures of less than 120° C. and a stretchability of over 300% when that temperature is exceeded have also proven to be suitable.

The decorative layer 3 of the embodiment shown in FIG. 1 includes a transparent protective lacquer layer 4, adjoining the detachment layer 2. A decorative lacquer layer 5 which for example forms a grain effect is printed onto the protective lacquer layer 4, in accurate register or matching relationship. A continuous colored lacquer layer 6 is provided adjacent the decorative lacquer layer 5. The last layer of the decorative layer 3 is formed by an adhesive layer 7, for example comprising a heat-activatable adhesive.

The layer thicknesses in the case of the thermal transfer foil of FIG. 1 are as follows:

| | |
|---|---|
| Detachment layer | 0.01–0.50 μm |
| Protective lacquer layer | 1–5 μm |
| Decorative lacquer layer | 0.1–2 μm |
| Coloured lacquer layer | 3–25 μm |
| Adhesive layer | 5–20 μm |

In use the thermal transfer foil as shown in FIG. 1 is pressed against the suitably structured surface of a substrate either by means of a membrane or also only by virtue of a suitable pressure difference, using the thermal transfer foil itself as a membrane. In that situation, the decorative layer 3 faces towards the substrate and is fixed to the substrate surface by means of the adhesive layer 7. After the thermal transfer foil has been completely applied against the substrate surface and possibly after a certain degree of cooling, the carrier film 1 is then pulled off the decorative layer 3 and therewith the substrate surface, that operation being facilitated by the provision of the detachment layer 2. The detachment layer 2 can possibly be omitted if the protective lacquer layer 4 is of such a composition that it can be suitably easily detached from the surface of the carrier film 1.

It will be appreciated that the structure of the decorative layer 3 may be different from the embodiment shown in FIG. 1. In particular it may be possible under some circumstances to omit the colored lacquer layer 6 or the protective lacquer layer 4. However the essential consideration is that there is a decorative lacquer layer which is suitably printed on, in accurate register relationship. The adhesive layer 7 may also be omitted under some circumstances, more specifically if either the colored lacquer layer 6 or the layer portion of the decorative layer 3, which is furthest remote from the carrier film 1, affords sufficient adhesion to ensure that the decorative layer 3 adheres to the substrate surface, or if the adhesive layer is applied prior to application of the decorative layer 3 to the substrate, for example by being sprayed thereon, or the like.

The layers forming the decorative layer 3 may be for example of the following composition:

| | Parts by weight |
|---|---|
| Detachment layer 2 | |
| Water, deionised | 740 |
| Polyvinyl alcohol (degree of hydrolysis 98.4 ± 0.4 mol %) | 10 |

-continued

| | Parts by weight |
|---|---|
| Ethyl alcohol | 250 |
| Protective lacquer layer 4 | |
| Methyl ethyl ketone | 400 |
| Toluene | 230 |
| Cyclohexanone | 100 |
| Methylmethacrylate (Tg = 105° C.) | 195 |
| Polyethylene wax (Mp = 140° C.) | 75 |
| Decorative lacquer layer (grain effect) 5 | |
| Methyl ethyl ketone | 270 |
| Ethylacetate | 175 |
| Butylacetate | 200 |
| Methyl-n-butyl-methacrylate (Tg = 80° C.) | 86 |
| Methylmethacrylate (Tg = 35° C.) | 114 |
| High-molecular dispersing additive (40%, amino number: 20) | 50 |
| Pigment Brown 23 | 45 |
| Pigment Yellow 93 | 40 |
| Pigment Black 7 | 20 |
| Coloured lacquer layer (back-up) 6 | |
| Methyl ethyl ketone | 250 |
| Toluene | 135 |
| Ethylacetate | 80 |
| Methyl-n-butyl-methacrylate (Tg = 80° C.) | 145 |
| Methylmethacrylate copolymer (Tg = 86° C.) | 60 |
| Highly dispersed silicic acid (particle size 10 μm) | 5 |
| High-molecular dispersing additive (40%, amino number: 20) | 15 |
| Titanium dioxide ($TiO_2$-content 94%, d = 4.1 g/cm$^3$) | 250 |
| Iron oxide yellow (Pigment Yellow 42, d = 4.1 g/cm$^3$) | 60 |
| Adhesive layer 7 | |
| Ethyl alcohol | 180 |
| Toluene | 300 |
| Thermoplastic polyamide resin (softening point: 140° C.) | 80 |
| Ketone formaldehyde resin (softening point: 85° C.) | 60 |
| Ethylmethacrylate copolymer (Tg = 50° C.) | 60 |
| Highly dispersed silicic acid (particle size 10 μm) | 5 |
| High-molecular dispersing additive (40%, amino number: 20) | 15 |
| Titanium dioxide ($TiO_2$-content 94%, d = 4.1 g/cm$^3$) | 250 |
| Iron oxide yellow (Pigment Yellow 42, d = 4.1 g/cm$^3$) | 50 |

Figure 2:
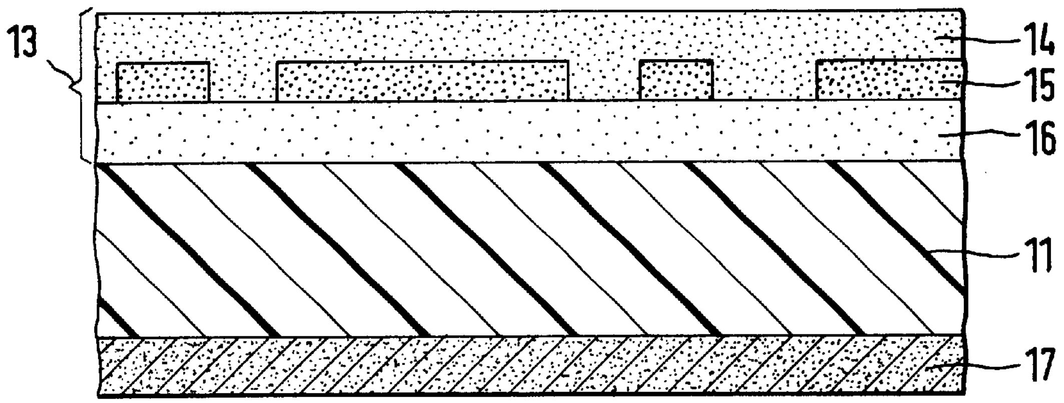
FIG. 2 shows a lamination foil.

Reference is now made for illustrative purposes to FIG. 2 which shows a lamination foil, that is to say a foil which, unlike the thermal transfer foil of FIG. 1 is transferred as a whole onto the surface of a substrate and which remains as such thereon without the carrier film being removed.

Unlike the foil shown in FIG. 1 in which all further layers are arranged on one side of the carrier film, in the case of the lamination foil shown in FIG. 2 the carrier film 11 carries an adhesive layer 17, on the one side of the carrier film 11, which in use is in contact with the substrate surface. Arranged on the other side of the carrier film 11 is the decorative layer 13 which, similarly to the embodiment of the invention shown in FIG. 1, also comprises a transparent protective lacquer layer 14, a decorative lacquer layer 15 which forms a patterning effect, for example a graining effect, and a continuous colored lacquer layer 16.

While however in the embodiment of the invention of FIG. 1 the gaps in the decorative lacquer layer 5 are filled by the colored lacquer layer 6, the foil shown in FIG. 2 involves a configuration such that the transparent protective lacquer 14 passes into the gaps in the decorative lacquer layer 15. This is due to the fact that, in the embodiment shown in FIG. 1, the protective lacquer layer 4, the decorative lacquer layer 5 and the colored lacquer layer 6 are successively applied in that order, whereas in the embodiment of FIG. 2 firstly the colored lacquer layer 16, then the decorative lacquer layer 15 and finally the protective lacquer layer 14 are applied to the carrier film 11.

The layer thicknesses in the case of the lamination foil shown in FIG. 2 are as follows:

| | |
|---|---|
| Adhesive layer 17 | 5–20 μm |
| Carrier film 11 | 30–100 μm |
| Coloured lacquer layer 16 | 3–25 μm |
| Decorative lacquer layer 15 | 0.1–2 μm and |
| Protective lacquer layer 14 | 1.0–5.0 μm |

The carrier film 11 of the foil shown in FIG. 2 corresponds in terms of its composition to the carrier film 1 in FIG. 1.

The lacquer or adhesive layers may desirably be of the following composition:

| | Parts by weight |
|---|---|
| Protective lacquer layer 14 | |
| Methyl ethyl ketone | 240 |
| Ethylacetate | 130 |
| Cyclohexanone | 150 |
| Polymethylmethacrylate (Tg = 110° C.) | 69 |
| Hydroxy-functional acrylate (60% in EGA, OH-content 6%) | 101 |
| Cellulose nitrate (65% in alcohol, low viscosity) | 30 |
| Polyethylene wax (Mp = 140° C., 20% in toluene) | 100 |
| Aromatic polyisocyanate (50% in ethylacetate, NCO-content 8%) | 180 |
| Decorative lacquer layer (graining effect) 15 | |
| As layer 5 in FIG. 1 | |
| Coloured lacquer layer (back-up) 16 | |
| Methyl ethyl ketone | 250 |
| Toluene | 150 |
| Cyclohexanone | 180 |
| Polyester copolymer resin (softening point: 97° C.) | 100 |
| Ketone formaldehyde resin (softening point: 115° C.) | 60 |
| Highly dispersed silicic acid (particle size 10 μm) | 6 |
| High-molecular dispersing additive (40%, amino number: 20) | 15 |
| Titanium dioxide ($TiO_2$-content 94%, d = 4.1 g/cm$^3$) | 200 |
| Iron oxide yellow (Pigment Yellow 42, d = 4.1 g/cm$^3$) | 40 |
| Adhesive layer 17 | |
| Ethyl alcohol | 200 |
| Toluene | 300 |
| Thermoplastic polyamide resin (softening point: 140° C.) | 120 |
| Ketone formaldehyde resin (softening point: 85° C.) | 80 |
| Ethylmethacrylate copolymer (Tg = 50° C.) | 80 |
| Highly dispersed silicic acid (particle size 10 μm) | 5 |
| High-molecular dispersing additive (40%, amino number: 20) | 15 |
| Titanium dioxide ($TiO_2$-content 94%, d = 4.1 g/cm$^3$) | 200 |

It will be appreciated that the compositions of the various lacquer layers may be varied in dependence on the specific areas of use involved, while in particular it may be possible to omit individual layers. The thickness of the layers depends on the respective area of use and in particular must take account of the extent to which stretching of the foil and accompanying concomitant thinning of the layers is to be expected upon being applied to the three-dimensional surface of the substrate.

It will be appreciated that the above-described embodiment of the invention has been set forth solely by way of example and illustration thereof and that various modifications and alterations may be made therein without thereby departing from the spirit and scope of the invention.

We claim:

1. A thermal transfer foil for decorating three-dimensional substrate surfaces with heating, comprising a carrier film comprising a film selected from the group consisting of substantially amorphous, unstretched polyester, polyamide and polyamide-copolymer films, a decorative layer arranged on the carrier film and comprising at least one decorative lacquer layer printed on in region-wise fashion, forming a decoration in which each of the at least one decorative lacquer layers is in accurate register relationship with the other layers of the at least one decorative lacquer layer, and an adhesive layer for fixing to a substrate surface, the decorative layer being arranged between the carrier film and the adhesive layer, wherein the thermal transfer foil is capable of being applied to a three-dimensional substrate by a membrane press or by a suitable pressure difference using the thermal transfer foil as a membrane to transfer the decoration of the decorative layer to the three-dimensional substrate.

2. A foil as set forth in claim 1 wherein the carrier film is a polyethylene terephthalate film.

3. A foil as set forth in claim 1 wherein the carrier film is of a thickness of between about 20 to 100 μm.

4. A foil as set forth in claim 1 wherein the decorative layer further comprises a protective lacquer layer which covers the at least one decorative lacquer layer in use after application to a substrate surface.

5. A foil as set forth in claim 1 wherein the decorative layer farther comprises a colored lacquer layer which is under the at least one decorative lacquer layer in use after application to a substrate surface and which is applied over an entire surface area.

6. A foil as set forth in claim 4 wherein the decorative layer further comprises a colored lacquer layer which is under the at least one decorative lacquer layer in use after application to a substrate surface and which is applied over an entire surface area.

7. A foil as set forth in claim 1 comprising a detachment layer between the decorative layer and the carrier film.

8. A foil as set forth in claim 6 wherein the protective lacquer layer is between the carrier film and the at least one region-wise decorative lacquer layer, the at least one region-wise decorative lacquer layer is between the protective lacquer layer and the colored lacquer layer, and the colored lacquer layer is between the at least one region-wise decorative lacquer layer and the adhesive layer.

9. A foil as set forth in claim 8 further comprising a detachment layer between the carrier film and the protective lacquer layer.

* * * * *